United States Patent [19]
Marino

[11] 4,326,339
[45] Apr. 27, 1982

[54] DEVICE FOR LOCATING CENTER POSITIONS

[76] Inventor: Carlo Marino, 1420 Tasker St., Philadelphia, Pa. 19145

[21] Appl. No.: 126,788

[22] Filed: Mar. 3, 1980

[51] Int. Cl.³ .............................................. G01B 3/30
[52] U.S. Cl. ....................................... 33/191; 33/150
[58] Field of Search .............. 33/150, 191, 192, 23 B, 33/444, 180 R

[56] References Cited

U.S. PATENT DOCUMENTS

| 224,401 | 2/1980 | Derickson | 33/158 X |
| 452,019 | 5/1891 | Pedersen | 33/191 |
| 863,415 | 8/1907 | Matthews | 33/376 X |
| 2,413,768 | 1/1947 | Hyde | 33/158 |
| 2,599,819 | 6/1952 | Fisher | 33/191 |
| 2,816,366 | 12/1957 | Barlow | 33/180 R |
| 2,928,178 | 3/1960 | Wilcox | 33/23 B |

FOREIGN PATENT DOCUMENTS 62978 7/1892 Fed. Rep. of Germany ...... 33/23 B

Primary Examiner—Harry N. Haroian
Attorney, Agent or Firm—Seidel, Gonda, Goldhammer & Panitch

[57] ABSTRACT

A device is provided for locating the center position of an object directly, without the need of measurement or mental computation. The device comprises a generally flat elongated frame having a center point marker and distance scales. Two pins are journaled in the frame, and a cord is disposed around the pins to form a taut, endless pulley. Alternately, the pins can be eliminated and the frame slotted to receive the cord. Two end point markers are attached to the cord, one on each run of the pulley circuit. The end point markers abut at the center point marker on the frame. In use, the end point markers are adjusted to match the ends of the object in question. Since the displacement of each end point marker from the center point is equal, the center point marker indicates the center point of the object. Additional features provided are a lock screw to hold the index markers in one position, and a fine tuning adjustment to make fine corrections to the end point marker positions.

10 Claims, 10 Drawing Figures

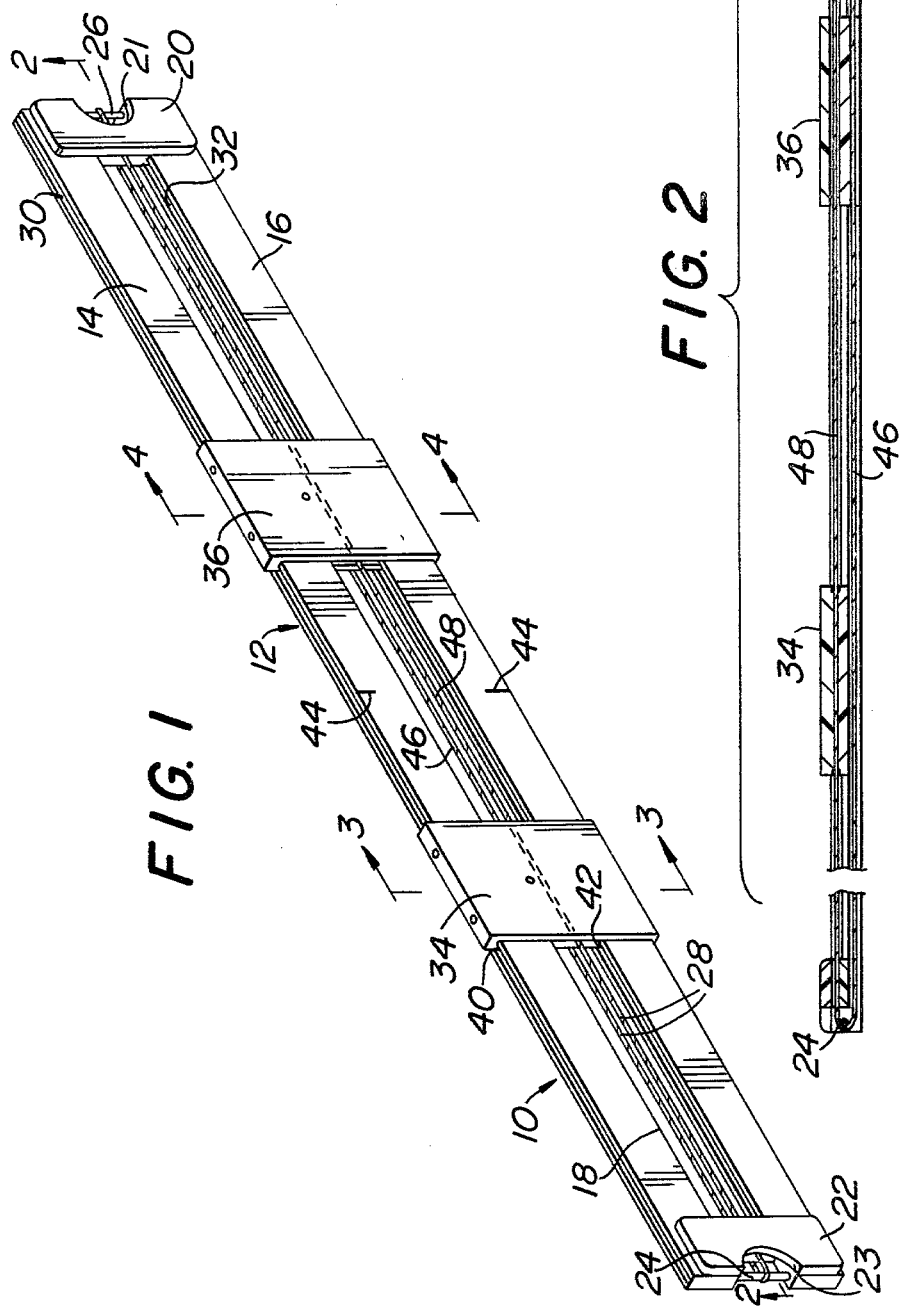

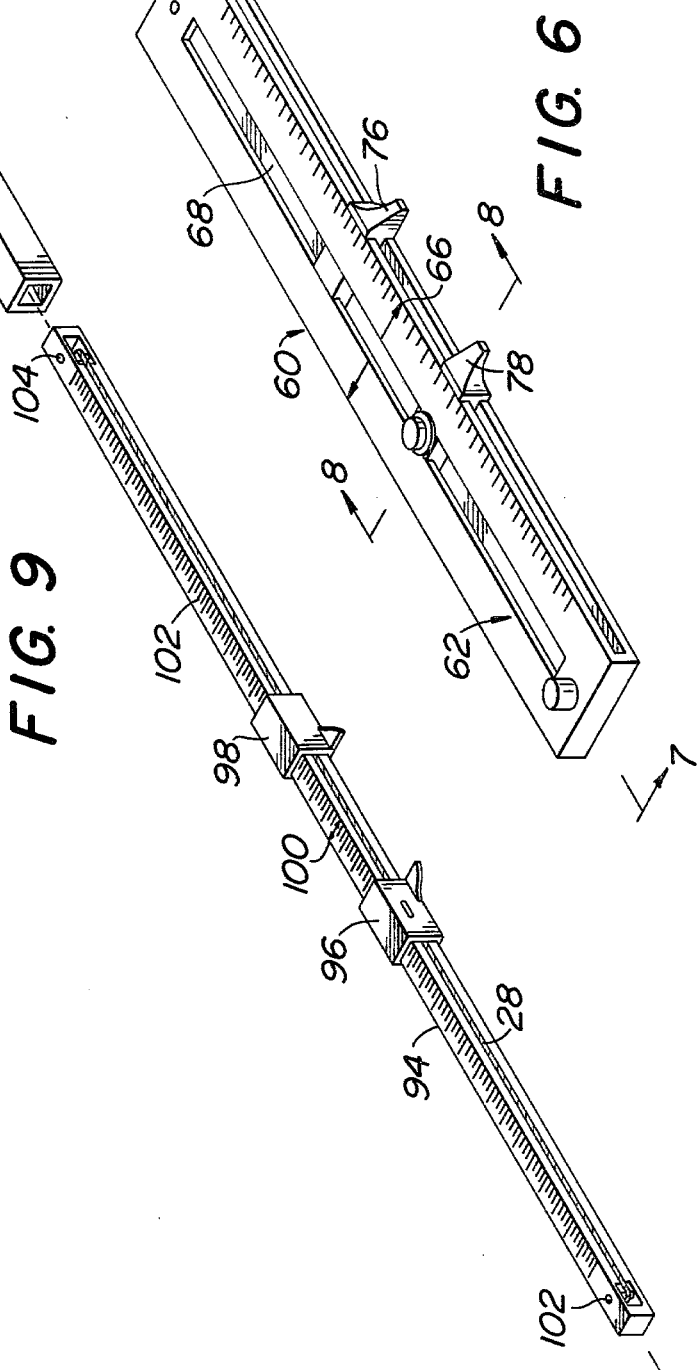

DEVICE FOR LOCATING CENTER POSITIONS

BACKGROUND OF THE INVENTION

It is very desirable in some applications to be able to directly determine the center position of an object without the need for measurement and mental calculation. Such devices are particularly handy when the center point is the only dimension of utility and the user is not interested in determing the length of the object. However, even when the object's length is to be determined or is already known, a center point indicating device provides a quick marking indication. Most center indicating devices can be combined with a distance scale so that both length and center point can be read out directly.

Devices giving a direct indication of the center position of an object have been in use for many years. There has been a variety of such devices, but in general they can be grouped into two categories. The first such category is a screw-type arrangement, wherein a threaded rotatable traverse bar with oppositely threaded sections is journaled in a rectangular frame. The mid-point of the traverse bar, where direction of the thread rotation changes, delineates the center point of the device. End point markers having channels through which the traverse bar passes and which engage the threads are slideably mounted on the rectangular frame. Rotation of the traverse bar moves the markers at equal displacements from the center point. Center indicating devices of this type are disclosed in U.S. Pat. Nos. 1,280,379 and 2,559,280.

The second general category of direct indicating center position finders are those which use two parallel rack bars with teeth meshed to opposite tangents to a pinion gear, so that rotation of the pinion gear causes equal displacements of the rack bars. The center point of the pinion marks the center indicating point, and end point markers are attached to the rack bars. Devices using essentially this rack bar and pinion system are disclosed in U.S. Pat. Nos. 2,599,819; 3,137,947 and 3,583,823.

The present invention relates to a different category, in which the center finding device uses what is primarily a pulley system, wherein an endless cord is turnable around two sheaves. There are decided advantages to the use of a pulley system. Such a system is more simply constructed and allows the use of lower cost materials. For example, the screw-threaded traverse bar of the first type system and the rack bars and pinion of the other type system are normally constructed of metal. By contrast, when using a pulley type system there is little need for the use of metal. In the preferred embodiment envisioned, only the sheaves and a few pins and lock screws are of metal construction, and even those could usably to made of other similar materials.

Because there is no major longitudinal metallic member, a center measuring device of this improved type can be made more flexible thereby reducing the chances that it will be broken or permanently bent by inadvertent side loads. In fact, this type device can be provided with hinges allowing it to be folded up for carrying. The hinges could be provided at several points, although a single hinge at the center point between two equal length sections is probably the most satisfactory. Thus, this center finding device is in many ways inherently more durable than the earlier types.

A pulley-type device is also more easily assembled and manufactured. In a center indicating device of the two previous types, care must be taken to locate the center of the traverse bar or the center of the pinion at the center point marking on the scale of the device. In the present invention there is no need to precisely locate the sheaves, so long as they are generally located beyond the end points of a measuring scale, if such scale is provided. By placing the end point markers in abutment at the center point indicator, and attaching the cord in a proper manner to the respective markers, the device can be assembled and the scale aligned with little difficulty.

The pulley system also provides for quicker manipulation of the end point markers than can be expected from gear devices or screw devices. While it may generally be true that the latter device can allow a fine-tuning feature by providing a precise rotational control for the screw, an adequate fine-tuning feature will be shown in this application for the pulley device.

Such considerations are significant in that a generally low cost center point finder is presently envisioned to be the preferred embodiment of this invention. Such a device should be easy to use, provide several desirable extra functions such as a position lock and a fine tuning adjustment, and yet be capable of being constructed and sold at a reasonable cost for general and home usage.

SUMMARY OF THE INVENTION

A device is provided for locating the center position of an object directly, without the need of measurement or mental computation. The device comprises a generally flat elongated frame having a slot extending substantially over its longitudinal length. A center point index marker at approximately the longitudinal mid-point of the frame is used to mark the center point of the object whose center is to be determined. Two pins are journaled in the frame one at each end of the slot. The pins are disposed so that the axis of the pins lie in a plane perpendicular to the center line of the slot. A cord is disposed within the slot, around and in sliding engagement with the pins, or around sheaves mounted on the pins. The cord is attached to two end point markers in such a manner that a taut endless pulley circuit having an upper run and a lower run is formed. The end point markers are mounted for sliding engagement in a longitudinal direction along the frame. One of the end point markers is affixed to the cord on the upper run of the pulley circuit, and the other end point marker is affixed to the cord on the lower run of the pulley circuit. The point at which the end point markers are affixed to the cord are such that the markers abut each other at exactly the center point index marker of the frame.

One of the end point markers has mounted thereon a lock screw, which when screwed down into firm contact with the frame prevents the markers and thus the pulley system from further rotation around the sheaves. One of the sheaves can be manually turned by a fine tuning adjustment knob extending out from the frame, so that fine alignment of the end point markers is possible.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 1 is a perspective view of a primitive embodiment of the center finding device using the main structural features of a slide-rule.

FIG. 2 is a sectional view of the device in FIG. 1 along the lines 2—2.

FIG. 6 is a perspective view of a preferred embodiment of the device.

FIG. 9 is a perspective view of another embodiment of the device.

DETAILED DESCRIPTION OF THE DISCLOSURE

Figure 10:
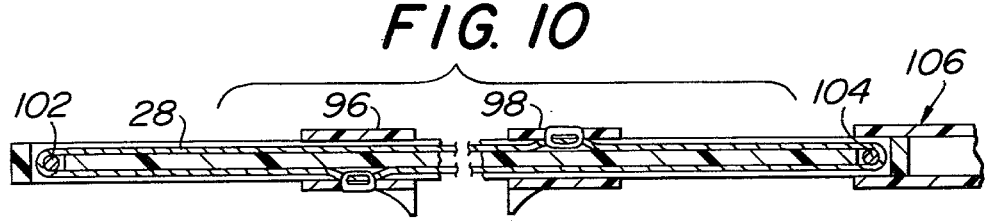
FIG. 10 is a sectional view of the device of FIG. 9 along the lines 10—10.

Referring to the drawings wherein like number indicate like elements there is shown in FIG. 1 a primitive model of a device, designated generally as 10, for determining the center position of an object without the need for measurement or mental computation. Device 10 is constructed from the major structural elements of a common slide rule, and is useful in that the principle of operation of the device is easily viewed. However, a device as shown in FIG. 10 might prove commercially advantageous to a manufacturer of slide-rules, in that there would be a standardization of parts within both product lines.

A generally rectangular flat elongated frame 12 is defined by upper frame member 14 and lower frame member 16. It should be noted that a frame of this shape is felt to be the most advantageous; however, alternative shapes such as tubular could be used. Upper member 14 and lower member 16 are mounted in a spaced parallel relationship, with the space between them defining a slot 18. Upper member 14 and lower member 16 are held in this spaced parallel relationship by end pieces 20 and 22. End pieces 20 and 22 have hemispheric cutouts 21 and 23, which are common to slide-rules and are useful in that further interior structure of the device may be viewed. However, any suitable structural device, such as end caps could be used to hold the upper and lower members in fixed position.

Journaled in frame members 14 and 16 are the respective ends of pins 24 and 26. Pins 24 and 26 are preferably metallic, but could be made of any suitable material. Looped around pins 24 and 26 and drawn taut is cord 28. Cord 28 should be a relatively inelastic material and should not frey readily from any abrasion caused by sliding contact around pins 24 and 26.

Figure 3:
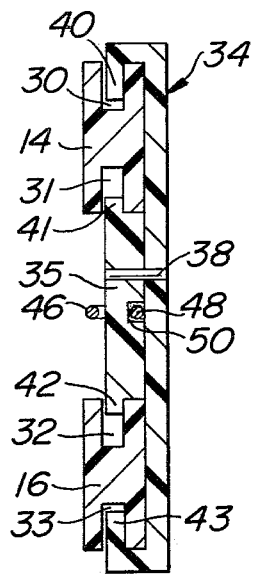
FIG. 3 is a sectional view of the device in FIG. 1 along the lines 3—3.
Figure 4:
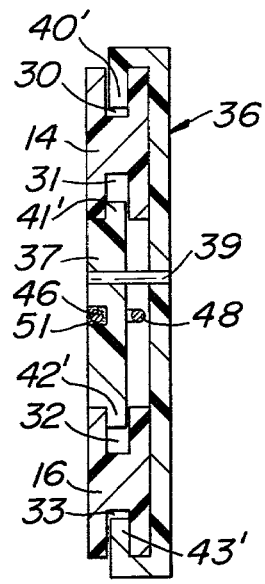
FIG. 4 is a sectional view of the device in FIG. 1 along the lines 4—4.

Referring now to FIGS. 3 and 4, upper frame member 14 has a shallow groove 30 extending along its upper length, and a similar groove 31 extending along its lower length. Similarly, lower frame member 16 has a shallow groove 32 extending along its entire upper length and a lower groove 33 extending along its entire lower length.

End point markers 34 and 36 are mounted in sliding engagement on frame 12. The sliding engagement is accomplished by depending flanges fitting into the shallow grooves of upper frame member 14 and lower frame member 16. Thus, end point marker 34 has an uppermost flange 40 depending into groove 30, an upper middle depending flange 41 depending into groove 31 on the lower side of upper frame member 14. A lower middle flange 42 depending into groove 32 and a bottom flange 43 depending into groove 33 on the lower side of the lower portion 16. Flanges 41 and 42 are part of a flat elongated strip which forms a center portion 35 of marker 34 and is secured to marker 34 by pin 38. Similarly, marker 36 has a center portion 37 secured thereto by pin 39. Marker 36 has flanges identical to marker 34, which are designated by the prime numbers 40', 41', 42' and 43'.

A center point index marker 44 is provided on the upper and lower members of frame 12. This is the mark from which the user will identify the center point of the object in question.

Cord 28 is attached to end point markers 34 and 36 in such a manner that the combination of cord 28 and end point markers 34 and 36 act as an endless cord. Master 34 is attached to cord 28 along lower pulley run 48. Lower run 48 lies in a groove 50 which traverses center section 35 in a longitudinal direction. Cord 28 is secured to marker 34 at this point, as by applying a liquid adhesive which fills groove 50 around the lower run 48 of cord 28, and upon drying holds marker 34 in a fixed position on lower run 48. Upper run 46 passes closely adjacent to and may be in sliding contact at points with center section 35.

End point marker 36 is mounted on cord 12 on upper run 46. Upper run 46 lies in shallow groove 51 of center section 37, and is affixed by a liquid adhesive substance which hardens to make a rigid connection. Lower run 48 lies closely adjacent to and may make in sliding contact at points with center section 37.

The point of attachment of end point markers 34 and 36 on lower run 48 and upper run 46 respectively are particularly important to the center finding function. This relationship can be most easily visualized by looking at a probable method of performing attachment at the correct positions. End points 34 and 36 would be pushed together to abut exactly at center point index marker 44. Then cord 28 would be placed around pins 24 and 26, through grooves 50 and 51 and pulled taut. Cord 28 would be fastened to markers 34 and 36 in grooves 50 and 51. A liquid adhesive would be placed in grooves 50 and 51 and allowed to harden to form a stronger and more durable attachment.

It will also be understood that cord 28 could be twisted once without effecting its operation. That is, the lower run 48 and upper run 46 could cross in the center. This would allow identical end markers to be attached, since each end marker could be attached to the lowermost or uppermost run on its side of the center point. However, the straight-run arrangement is favored. Thus, the terms lower run and upper run are used for the relative positions at an end of the device.

It can now be seen how the center point finder operates. The user simply pulls apart the end point markers, sliding them back and forth until the inside edges of the center point markers exactly touch the end points of the object whose center is to be determined. Since the displacement of marker 34 and 36 from the centered position must be exactly equal, the center point marker 44 will identify the exact center of the object in question.

Figure 5:
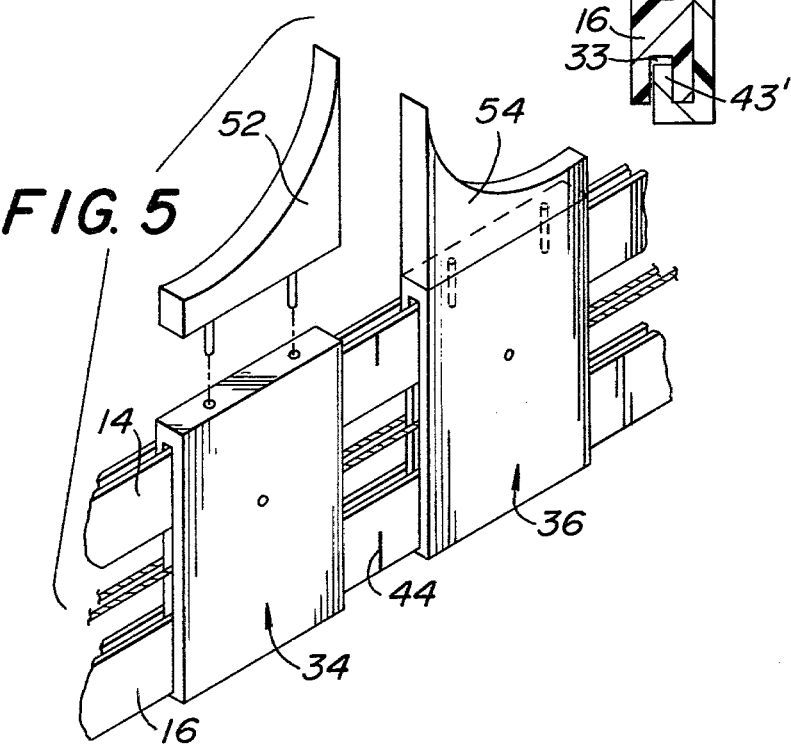
FIG. 5 is a partial perspective view of the device in FIG. 1 showing the addition of caliper attachments.

In some applications it may be desirable to have caliper extensions 52 and 54 mounted on end point markers 34 and 36, as shown in FIG. 5. This would be the case when deteriming the center of an irregular solid object or of the diameter of a pipe, or generally in any application in which it would be awkward to align markers 34 and 36 with the ends of the object.

In FIG. 6 is shown a presently preferred embodiment 60 of the center finding device. Device 60 has a generally flat elongated rectangular frame 62. It is expected that frames 62 will be constructed of inexpensive wood or plastic material. Frame 62 is not integrally formed, but rather constructed in at least two major longitudinal sections, a front and back. This allows for ease in installing the sheaves, cord and end point markers.

Frame 62 has a scale 64 marked on the upper facing surface. Center point index marker 66 is the starting point for scale 64. It will be understood that scale 64 can be of any convenient measurement system, such as inches, metric, pica, or agate. More than one scale could be incorporated on frame 62, each having center point index marker 66 as the beginning point of the scale.

It is important to note however, that whatever scale is selected, the graduations in both directions from center point index marker 66 should be one half value of the actual scale measurement. For instance, if an inches scale is used, the first whole integer value on either side of center point marker 66 should read one inch, but the actual distance from center point marker to the one inch marking will only be one half inch. The distance between the one inch marking to the left of index 66 and the one inch marker to the right of index 66 will be a full inch. Having thus constructed the scale, the user will be able to read the width of an object directly by looking below either one of the end point markers. The center will be directly indicated by center point index marker 66.

Figure 7:
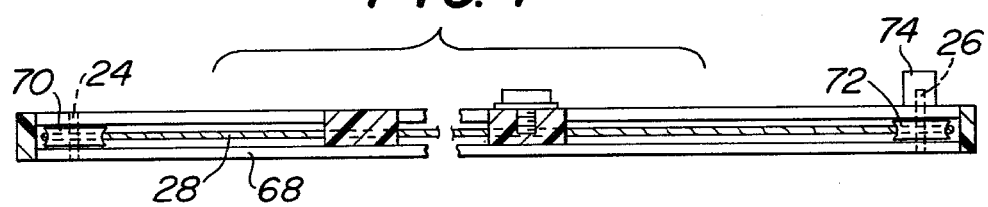
FIG. 7 is a sectional view of the device in FIG. 6 along the lines 7—7.

The frame 62 has a narrow rectangular slot 68 running longitudinally past both extremeties of scale 64. Slot 68 is preferably narrow, to hide cord 28 (visable in FIG. 7) and protect against wear. Cord 28 is not mounted directly on pins 24 and 26 as in the embodiment shown previously. Instead, pins 24 and 26 have mounted thereon sheaves 70 and 72, and cord 28 is disposed around the sheaves. Sheaves 70 and 72 reduce sliding friction on cord 28 and produce a smoother movement. Additionally, sheave 72 provides a fine tune adjustment through knob 74. Fine tune knob 74 is mounted on an extension of pin 26 and rotates therewith. Pins 24 and 26 are rigidly attached to sheaves 70 and 72, and hence rotate with the shafts. Fine tune knob 74 provides a larger circumference than pin 26, so that the user may grasp knob 74 between thumb and forefinger to make fine corrections to the positions of the end point markers.

Figure 8:
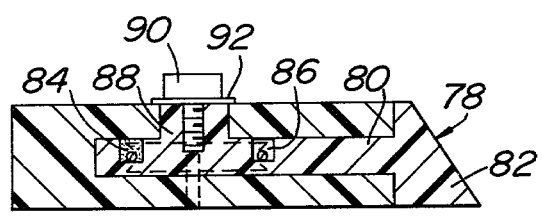
FIG. 8 is a sectional view of the device of FIG. 6 along the lines 8—8.

End point markers 76 and 78 are similar in principle of operation to the end point markers 34 and 36 with caliper attachments shown in FIG. 5. End point marker 78 is depicted in FIG. 8, and has a generally rectangular portion 80 and a caliper portion 82. Cord 28 passes through shallow grooves 84 and 86. In end point marker 78, the lower run of cord 28 is affixed to marker 78 by a liquid adhesive pored into groove 84 and allowed to dry. In end point marker 78, cord 28 is affixed on the upper run by placing the liquid adhisive in groove 86. Marker 76 and 78 also have a rail portion 88 which fits snugly in sliding contact within slot 68.

End point marker 78 has an additional feature not found on marker 76. A locking screw 90 is provided. Locking screw 90 fits into a threaded cavity in rail 88. Screw 90 has a base flange 92 which is wider than rail 88 and extends over the edge of slot 68. For normal use, screw 90 is turned down until it is in loose sliding engagement with frame 62. However, it may occasionally be desirable to lock in an end point measurement. In that instance, the user, having adjusted end point markers 76 and 78 to mark the ends of the object, can screw down the locking screw 90 and prevent the cord 28 and hence the end point markers 76 and 78 from moving. This feature might be useful as for instance in comparing a multiplicity of objects to determine which are of the same size.

Although not illustrated in the drawings, it is envisioned that the frame 62 could be made up of longitudinal sections connected by hinges allowing the entire device to be folded up into a compact unit for carrying and storage. The cord 28 would be unaffected by folding. The number and placement of the hinges can be varied to give a carrying unit of a desired size. The placement and type of hinges which can be used are well within the skill of the average practitioner, and need not be further discussed.

A third embodiment is shown in FIG. 9. Frame 94 has a narrow elongated rectangular shape, approximately square in cross section. End point markers 96 and 98 are box sleeves which enclose a segment of frame 94. A center point marker 100 and associated scale 102 are provided on the upper face of frame 94. Additional scales could be provided on other faces. Cord 28 is disposed around pins 102 and 104. One run of cord 28 is secured to end point marker 96 and the other run to end point marker 98.

An extension sleeve 106 is provided to elongate the center finder for large objects. One such extension sleeve 106 can be placed over each end of frame 94 and into abutment with end point markers 96 and 98. By aligning the ends of extender sleeve 106 with the ends of the object, the center will still be indicated by center point marker 100, since the device has been extended in both directions by exactly the length of extenders 106.

The present invention may be embodied in other specific forms without departing from the spirit or essential attributes thereof, and, accordingly, reference should be made to the appended claims, rather than to the foregoing specification, as indicating the scope of the invention.

I claim:

1. A device for locating center positions, comprising:
   (a) elongated frame members spaced by a slot extending substantially the longitudinal length of the frame members, a center point index marker at approximately the longitudinal midpoint of one of the frame members;
   (b) two pins journaled in and extending between the frame members, one pin being at each end of the slot and disposed so that the axes of the pins lie in a plane perpendicular to the center line of the slot;
   (c) an endless cord disposed within the slot and around the pins thereby forming a taut endless pulley circuit having an upper run and a lower run;
   (d) two end-point markers, each marker having a passageway through which a run of said cord extends, means in each passageway joining one marker to the cord on the upper run of the pulley circuit and the other marker to the cord on the lower run of the pulley circuit, the points of affixation being such that the markers abut each other at the center point index marker of the frame; and (e) one of the frame members being generally flat and having a length indicating distance scale provided thereon adjacent said markers.

2. A device for locating center positions as in claim 1, further comprising two sheaves, one mounted on each of said pins and having the cord disposed on said sheaves so that said sliding cooperation between the cord and the pins is caused by the rotation of the sheaves.

3. A device for locating center positions as in claim 2, further comprising one of said pins having an extended portion passing out of said frame and having a large diameter knob rigidly attached to said extended portion of the pin, so that rotation of said large diameter knob causes the corresponding sheave to turn, thereby effecting a fine tuning of the end point markers.

4. A device for locating center positions as in claim 1, further comprising said end point markers having caliper projections disposed thereon.

5. A device for locating center positions as in claim 1, further comprising one of the end point markers having a locking means for locking said end point marker to the frame whereby further movement of the end point markers is inhibited.

6. A device for locating center positions as in claim 5 wherein said locking means is a screw threaded into the end point marker which engages the frame when the screw is turned into the threads past a certain point and the engagement with the frame inhibits movement of the end point marker relative to the frame.

7. A device for locating center positions as in claim 1 wherein said elongated frame member comprises a plurality of longitudinal sections connected to each other by hinges, whereby said longitudinal sections can be folded together to form a compact unit for carrying.

8. A device for locating center positions as in claim 1 further comprising a pair of attachable extender bars of equal length, each for fitting in a telescopic connection over a respective end of the elongated frame.

9. A device for locating center positions, comprising:
(a) an elongated frame having a center point index marker at approximately the longitudinal midpoint of the frame;
(b) a cord mounted on the frame and extending over substantially the entire length thereof, forming a taut endless pulley circuit having an upper run and a lower run;
(c) two end-point markers, one affixed to the cord on the upper run of the pulley circuit, and one affixed to the cord on the lower run of the pulley circuit, the points of affixation being such that the markers about each other at the center point index marker of the frame;
(d) said frame including upper and lower frame members, said markers having a portion between said frame members, each such portion of said markers being connected to one of said runs;
(e) one of said frame members having a scale adjacent an exposed portion of said markers.

10. A device in accordance with claim 9 wherein said marker portions include a passageway through which a run of said cord extends, and an adhesive securing each cord run to its associated marker passageway.

* * * * *